(12) United States Patent
Freundlich et al.

(10) Patent No.: US 8,390,688 B2
(45) Date of Patent: Mar. 5, 2013

(54) DEVICE, METHOD AND SYSTEM OF REGISTERING WIRELESS COMMUNICATION MODULES

(75) Inventors: Shay Freundlich, Givat Ada (IL); Netanel Goldberg, Zichron Yaakov (IL); Meir Feder, Herzliya (IL)

(73) Assignee: Amimon Ltd., Herzlia (IL)

( * ) Notice: Subject to any disclaimer, the term of this patent is extended or adjusted under 35 U.S.C. 154(b) by 1162 days.

(21) Appl. No.: 12/106,306

(22) Filed: Apr. 20, 2008

(65) Prior Publication Data

US 2009/0049494 A1 Feb. 19, 2009

Related U.S. Application Data

(60) Provisional application No. 60/955,894, filed on Aug. 15, 2007.

(51) Int. Cl.
*H04N 17/00* (2006.01)
*H04N 5/38* (2006.01)

(52) U.S. Cl. ........................................ 348/192; 370/458

(58) Field of Classification Search .................. 709/201; 348/192

See application file for complete search history.

(56) References Cited

U.S. PATENT DOCUMENTS

| | | | | |
|---|---|---|---|---|
| 5,940,841 A * | 8/1999 | Schmuck et al. | | 1/1 |
| 7,159,217 B2 * | 1/2007 | Pulsipher et al. | | 718/100 |
| 7,512,704 B2 * | 3/2009 | Nelson et al. | | 709/238 |
| 7,685,224 B2 * | 3/2010 | Nye | | 709/201 |
| 2003/0224815 A1 | 12/2003 | Rodman | | |
| 2004/0034550 A1 * | 2/2004 | Menschik et al. | | 705/3 |
| 2005/0027890 A1 * | 2/2005 | Nelson et al. | | 709/250 |
| 2006/0080702 A1 * | 4/2006 | Diez et al. | | 725/30 |
| 2006/0112176 A1 * | 5/2006 | Liu et al. | | 709/223 |
| 2006/0150222 A1 | 7/2006 | McCafferty et al. | | |
| 2006/0184931 A1 * | 8/2006 | Rochette et al. | | 717/169 |
| 2007/0032198 A1 * | 2/2007 | Sakamoto | | 455/69 |
| 2007/0182812 A1 * | 8/2007 | Ritchey | | 348/36 |
| 2007/0286130 A1 * | 12/2007 | Shao et al. | | 370/336 |
| 2008/0024594 A1 * | 1/2008 | Ritchey | | 348/36 |
| 2008/0240146 A1 * | 10/2008 | Singh et al. | | 370/458 |
| 2009/0102927 A1 * | 4/2009 | Tatsuta et al. | | 348/192 |

\* cited by examiner

*Primary Examiner* — Evens J Augustin

(74) *Attorney, Agent, or Firm* — Eitan, Mehulal & Sadot

(57) ABSTRACT

Some demonstrative embodiments include devices, systems and/or methods of registering wireless video communication modules. A method of registering wireless video modules may include, for example, transmitting a first registration message from a first wireless video communication module to a second wireless video communication module, wherein the first registration message includes first information identifying the first module to the second wireless video communication module; receiving at the first module a second registration message from the second wireless video communication module, wherein the second registration message includes second information identifying the second module to the first wireless video communication module; and based on the first and second registration messages, registering the first video communication module at the second wireless video communication module and the second video communication module at the first wireless video communication module. Other embodiments are described and claimed.

8 Claims, 8 Drawing Sheets

DEVICE, METHOD AND SYSTEM OF REGISTERING WIRELESS COMMUNICATION MODULES

CROSS-REFERENCE

This application claims priority from and the benefit of U.S. Provisional Patent application 60/955,894, entitled "Device, Method and System of Wireless Communication Including Video and/or Audio Information", filed Aug. 15, 2007, the entire disclosure of which is incorporated herein by reference.

FIELD

Some embodiments relate generally to the filed of wireless communication and, more particularly, to wireless communication including video and/or audio information.

BACKGROUND

Wireless communication has rapidly evolved over the past decades. Even today, when high performance and high bandwidth wireless communication equipment is made available there is demand for even higher performance at a higher data rates, which may be required by more demanding applications.

In many houses, video signals are received through cable or satellite links at a Set-Top Box (STB) located at a fixed point. In many cases, it may be desired to place a screen or projector at a location in a distance of at least a few meters from the STB. This trend is becoming more common as flat-screen displays, e.g., plasma or liquid crystal display (LCD) televisions are hung on a wall. Connection of such a display or projector to the STB through cables is generally undesired for aesthetic reasons and/or installation convenience. Thus, wireless transmission of the video signals from the STB to the screen is preferred.

SUMMARY

Some demonstrative embodiments include systems and/or methods of wireless video communication.

Some demonstrative embodiments include a method of registering wireless video modules. The method may include transmitting a first registration message from a first wireless video communication module to a second wireless video communication module, wherein the first registration message includes first information identifying the first module to the second wireless video communication module; receiving at the first module a second registration message from the second wireless video communication module, wherein the second registration message includes second information identifying the second module to the first wireless video communication module; and based on the first and second registration messages, registering the first video communication module at the second wireless video communication module and the second video communication module at the first wireless video communication module.

In some demonstrative embodiments, transmitting the first registration message may include transmitting the first registration message to the second module only if a registration instruction to register the first and second modules is received from a user of the first module.

In some demonstrative embodiments, transmitting the first registration message may include transmitting the first registration message within a predefined time period after receiving the instruction from the user of the first module.

In some demonstrative embodiments, the method may include transmitting the second registration message from the second module to the first module only if a registration instruction to register the first and second modules is received from a user of the second module.

In some demonstrative embodiments, transmitting the second registration message may include transmitting the second registration message within a predefined time period after receiving the instruction from the user of the second module.

In some demonstrative embodiments, registering the first and second modules may include storing the first information at the second module; and storing the second information at the first module.

In some demonstrative embodiments, the first information may include a first media-access-control address assigned to the first module, and the second information may include a second media-access-control address assigned to the second module.

In some demonstrative embodiments, the first and second media-access-control addresses uniquely identify the first and second modules, respectively.

In some demonstrative embodiments, at least one of the first and second registration messages may include a public encryption key of at least one of the first and second modules, respectively.

In some demonstrative embodiments, at least one of the first and second registration messages may include an indication of a module type of at least one of the first and second modules, respectively.

In some demonstrative embodiments, one of the first and second modules may include a video source module, and another of the first and second modules may include a video destination module.

Some demonstrative embodiments include a wireless video communication network. The network may include a first wireless video communication module capable of transmitting a first registration message; and a second wireless video communication module capable of receiving the first registration message, which includes first information identifying the first module to the second module; and based on the first information, transmitting to the first module a second registration message including second information identifying the second module to the first module, wherein based on the first and second registration messages, the second module is to register the first module, and the first module is to register the second module.

In some demonstrative embodiments, the first module may include a user interface to receive a registration instruction from a user of the first module. The first module may be capable of transmitting the first registration message within a predefined time period after receiving the registration instruction.

In some demonstrative embodiments, the first module may include an indicator to indicate the time period.

In some demonstrative embodiments, the second module may include a user interface to receive a registration instruction from a user of the second module. The second module may be capable of transmitting the second registration message within a predefined time period after receiving the registration instruction.

In some demonstrative embodiments, the second module may include an indicator to indicate the time period.

In some demonstrative embodiments, the second module is capable of storing the first information, and the first module is capable of storing the second information.

In some demonstrative embodiments, the first information may include a first media-access-control address assigned to the first module, and the second information may include a second media-access-control address assigned to the second module.

In some demonstrative embodiments, the first and second media-access-control addresses uniquely identify the first and second modules, respectively.

In some demonstrative embodiments, one of the first and second modules may include a video source module, and another of the first and second modules may include a video destination module.

Some demonstrative embodiments include a wireless video communication module capable of receiving a first registration message including first information identifying another wireless video communication module; based on the first information, transmitting to the other module a second registration message including second information identifying the wireless video module; and registering the other module based on the first and second registration messages.

In some demonstrative embodiments, the wireless video communication module may include a user interface to receive a registration instruction from a user of the wireless video communication module. The wireless video communication module may be capable of transmitting the second registration message after receiving the registration instruction.

In some demonstrative embodiments, the wireless video communication module may be capable of storing the first information.

In some demonstrative embodiments, the first information may include a first media-access-control address assigned to the other module, and the second information may include a second media-access-control address assigned to the module. The first and second media-access-control addresses may uniquely identify the wireless video communication module and the other module, respectively.

In some demonstrative embodiments, the wireless video communication module may include a video source module or a video destination module.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Moreover, some of the blocks depicted in the drawings may be combined into a single function. The figures are listed below.

DETAILED DESCRIPTION

Figure 1:
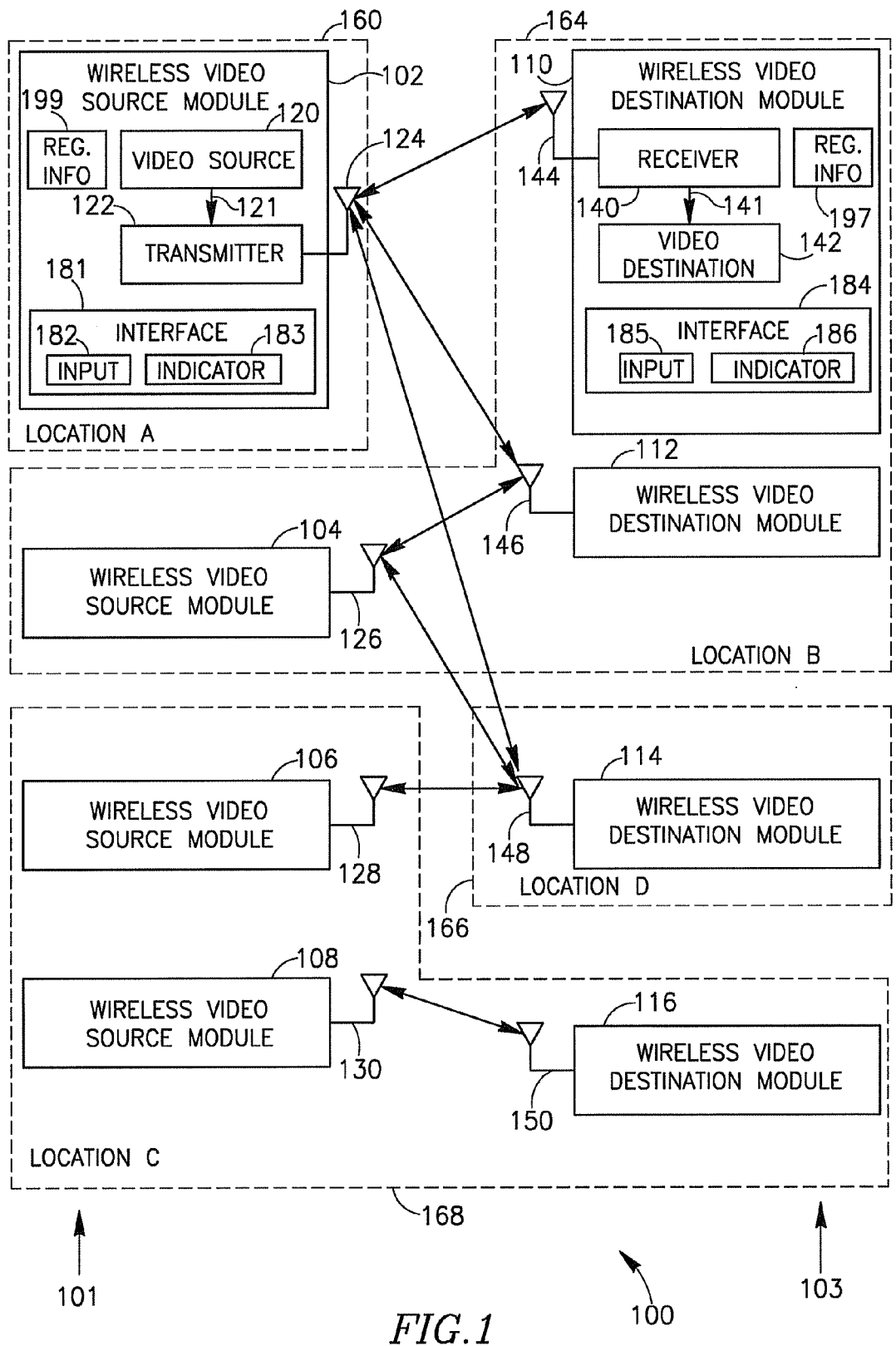
FIG. 1 is a schematic illustration of a wireless communication network, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing," "computing," "calculating," "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/ or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Reference is made to FIG. 1, which schematically illustrates a wireless video communication network 100, in accordance with some demonstrative embodiments.

According to some demonstrative embodiments, network 100 may include a first group 101 of wireless video source modules capable of transmitting wireless video transmissions; and a second group 103 of wireless video destinations capable of receiving the wireless video transmissions, as described in detail below.

According to some demonstrative embodiments, at least the number of modules in at least one of groups 101 and 103 is equal to or greater than two. In one example, group 101 may include a single wireless video source module, and group 103 may include two or more wireless video destination modules. In a second example, group 101 may include two or more wireless video source module, and group 103 may include a single wireless video destination module. In a third example, group 101 may include two or more wireless video source modules, and group 103 may include two or more wireless video destination modules. The number of wireless video destination modules of group 101 may be equal to or different than the number of wireless video destination modules of group 103.

According to the demonstrative embodiments of FIG. 1, group 101 may include a plurality of wireless video source modules, e.g., wireless video source modules 102, 104, 106 and/or 108; and group 103 may include a plurality of wireless video destination modules, e.g., wireless video destination modules 110, 112, 114, and/or 116. wireless video source modules 102, 104, 106 and/or 108 may include at least one antenna 124, 126, 128 and/or 130, respectively, to transmit wireless video transmissions to wireless video destination modules 110, 112, 114, and/or 116. Wireless video destination modules 110, 112, 114, and/or 116 may include at least one antenna 144, 146, 148 and/or 150, respectively, to receive the wireless video transmissions. Although embodiments of the invention are not limited in this respect, types of antennae that may be used for antennas 124, 126, 128, 130, 144, 146, 148 and/or 150 may include but are not limited to internal antenna, dipole antenna, omni-directional antenna, a monopole antenna, an end fed antenna, a circularly polarized antenna, a micro-strip antenna, a diversity antenna and the like.

According to some demonstrative embodiments, the wireless video source modules of group 101 and the wireless video destination modules of group 103 may communicate with one another according to a bipartite communication scheme, as described in detail below.

Although embodiments of the invention are not limited in this respect, the term "bipartite communication scheme" as used herein may relate to a group of source modules able to communicate with a group of destination modules in accordance with a bipartite graph, wherein the source modules and destination modules are located on first and second sides of the graph, respectively. Wireless communications according to the bipartite communication scheme may be performed between a source module and a destination module, wherein each destination is capable of communicating with only a single source at a given moment, and each of the sources is capable of communicating with one or more destinations, e.g., at a given moment.

According to some demonstrative embodiments, in the bipartite communication scheme of FIG. 1 source module 102 may be capable of communicating, for example, with destination modules 110, 112 and 114; source module 104 may be capable of communicating, for example, with destination modules 112 and 114; source module 106 may be capable of communicating, for example, with destination module 114; and/or source module 108 may be capable of communicating, for example, with destination module 116, e.g., as described in detail below. In other examples, one or more of the source modules may communicate with one or more of the destination modules, e.g., according to any other suitable scheme.

According to some demonstrative embodiments, source modules 102, 104, 106 and/or 108 may include a video source to generate video information, e.g., in the form of video signals 121, which may be transmitted, for example, to destination modules 110, 112, 114, and/or 116. Video source 120 may generate video signals 121 in any suitable video format. In one example, signals 121 may include HDTV video signals, for example, uncompressed HDTV signals, e.g., in a Digital Video Interface (DVI) format, a High Definition Multimedia Interface (HDMI) format, or Video Graphics Array (VGA) format, e.g., over a DB-15 connector, and their extensions, or any other suitable video format. Video source 120 may include any suitable video software and/or hardware, for example, a portable video source, a non-portable video source, a Set-Top-Box (STB), a DVD player, a digital-video-recorder, a game console, a PC, a portable computer, a Personal-Digital-Assistant, a Video Cassette Recorder (VCR), a video camera, a video player, a portable-video-player, a portable DVD player, an MP-4 player, a video dongle, a cellular phone, and the like According to some demonstrative embodiments, source modules 102, 104, 106 and/or 108 may also include a wireless transmitter 122 to transmit to one or more destination modules of group 103 a wireless transmission including video information corresponding to video signals 121. Transmitter 122 may implement any suitable transmission method and/or configuration to transmit the wireless transmission. Although embodiments of the invention are not limited in this respect, in some demonstrative embodiments, transmitter 122 may generate the wireless transmission according to an Orthogonal-Frequency-Division-Multiplexing (OFDM) modulation scheme, or any other suitable transmission and/or modulation scheme. In some demonstrative embodiments, the wireless transmission may include Multiple-Input-Multiple-Output (MIMO) transmission.

Although embodiments of the invention are not limited in this respect, according to some demonstrative embodiments the wireless transmission transmitted by transmitter 122 may represent a plurality of transformation coefficients corresponding to video signals 121. For example, transmitter 122 may apply a de-correlating transformation, e.g., a DCT and/or a wavelet, to video signals 121, e.g., as described in U.S. patent application Ser. No. 11/551,641, entitled "Apparatus and method for uncompressed, wireless transmission of video", filed Oct. 20, 2006, and published May 3, 2007, as US Patent Application Publication US 2007-0098063 ("the '641 application"), the entire disclosure of which is incorporated herein by reference. For example, transmitter 122 may perform the de-correlating transform on a plurality of color components, e.g., in the format Y—Cr-Cb, representing pixels of video signals 121, as described in the '641 application. In some demonstrative embodiments, the wireless transmission may include values of fine constellation symbols, and values of coarse constellation symbols, e.g., as described in the '641 application.

According to some demonstrative embodiments, source modules 102, 104, 106 and/or 108 may also include a user interface 181 to receive one or more instructions from a user of the source module, and/or provide any suitable display and/or indication to the user. In one example, user interface 181 may be implemented as a separate interface unit or element of the wireless video source module. In another example, user interface 181 may be implemented as part of transmitter 122 and/or video source 120.

According to some demonstrative embodiments, interface 181 may be implemented for performing a registration operation to register the source module with a destination module, e.g., as described below. For example, interface 181 may include an input 182, e.g., in the form of a button, to receive a registration instruction from the user, e.g., as described below; and an indicator, e.g., in the form of a Light-Emitting-Diode (LED), to indicate one or more states of the registration operation, e.g., as described below.

According to some demonstrative embodiments, destination modules 110, 112, 114 and/or 116 may include a wireless receiver 140 to receive wireless transmissions transmitted by one or more source modules of group 101, e.g., by transmitter 122. Receiver 140 may generate output video signals 141, e.g., corresponding to video signals 121.

According to some demonstrative embodiments, source modules 110, 112, 114 and/or 116 may also include a video destination 142, which may include any suitable software and/or hardware to receive, process, store, and/or handle signals 121 in any suitable manner. In one example, video destination 142 may include any suitable video display and/or receiver. For example, video destination 142 may include a display or screen, e.g., a flat screen display, a Liquid Crystal Display (LCD), a plasma display, a back projection television, a television, a projector, a monitor, an audio/video receiver, and the like.

According to some demonstrative embodiments, destination modules 110, 112, 114 and/or 116 may also include a user interface 184 to receive one or more instructions from a user of the destination module, and/or provide any suitable display and/or indication to the user. In one example, user interface 184 may be implemented as a separate interface unit or element of the wireless video destination module. In another example, user interface 184 may be implemented as part of receiver 140 and/or video destination 142.

According to some demonstrative embodiments, interface 184 may be implemented for performing a registration operation to register the destination module with a source module, e.g., as described below. For example, interface 184 may include an input 185, e.g., in the form of a button, to receive a registration instruction from the user, e.g., as described below; and an indicator, e.g., in the form of a LED, to indicate one or more states of the registration operation, e.g., as described below.

According to some demonstrative embodiments, source modules 102, 104, 106 and/or 108 may also include registration information 199 corresponding to one or more destination modules of group 103, e.g., as described below. Although embodiments of the invention are not limited in this respect, in some demonstrative embodiments, registration information 199 may be stored, for example, in the form of a table wherein each row of the table includes registration information corresponding to a destination module. Registration information 199 stored by a source module of source modules 102, 104, 106 and/or 108 may also include registration information corresponding to the source module. For example, registration information 199 stored by source modules 102, 104, 106 and/or 108 may include registration information corresponding to source modules 102, 104, 106 and/or 108, respectively.

According to some demonstrative embodiments, destination modules 110, 112, 114 and/or 116 may also include registration information 197 corresponding to one or more source modules of group 101, e.g., as described below. Although embodiments of the invention are not limited in this respect, in some demonstrative embodiments, registration information 197 may be stored, for example, in the form of a table wherein each row of the table includes registration information corresponding to a destination module. Registration information 197 stored by a source module of destination modules 110, 112, 114 and/or 116 may also include registration information corresponding to the destination module. For example, registration information 197 stored by destination modules 110, 112, 114 and/or 116 may include registration information corresponding to destination modules 110, 112, 114 and/or 116, respectively.

In some demonstrative embodiments, the registration information corresponding to a module of groups 101 and 103 may include a Media-Access-Control (MAC) address ("ADDR"), and/or a device identification (ID) string ("STR-ID") assigned to the module. In some embodiments, the MAC address and/or device ID number may uniquely identify the module. For example, each module of groups 101 and 103 may be assigned with a different unique MAC address and/or device ID number. The MAC address and/or device ID number may include, for example, a string of a predefined length, for example, six or ten bytes. The registration information corresponding to the module may also include a public encryption key ("PBLC_KEY") assigned to the module. The public encryption key may have any suitable format, for example, a string having a length of ten or sixty-four bytes. The registration information may also include a device identification string, e.g., having a length of ten bytes. The registration information may include any other suitable information ("AUX information"), for example, a registration type, a registration expiration time, e.g., as described below.

According to some demonstrative embodiments, network 100 may include a local wireless communication network. Although embodiments of the invention are not limited in this respect, the term "local wireless communication network" as used herein may relate to a wireless communication network including two or more wireless communication modules located at a distance of no more than 500 meters (m), for example, no more than 100 m, for example, no more than 50 m, e.g., no more than 25 m, for example, no more than 5 meters. In one example, the distance between each wireless communication module of the local communication network and each of the other wireless communication modules of the local wireless communication network may be no more than 500 m, for example, no more than 100 m, for example, no more than 50 m, e.g., no more than 25 m, for example, no more than 5 meters. In some demonstrative embodiments, the distance between each two modules of modules 102, 140, 106, 108, 110, 112, 114, and/or 116 may be no more than 500 m, for example, no more than 100 m, for example, no more than 50 m, e.g., no more than 25 m, for example, no more than 5 meters.

According to some demonstrative embodiments, modules 102, 104, 106, 108, 110, 112, 114, and/or 116 may be located at one or more suitable locations, e.g., as described below.

In some demonstrative embodiments, one or more of modules 102, 104, 106, 108, 110, 112, 114, and/or 116 may be located at a first location, while one or more of modules 102, 140, 106, 108, 110, 112, 114, and/or 116 may be located at a second location, which may be distant and/or separated by one or more obstacles, e.g., walls, windows, furniture, and/or doors, from the first location. In one example, a source module may communicate with one or more destination modules located in proximity to the source module, e.g., located within a first room; and/or one or more distant destination modules, e.g., located within a second room, e.g., as described below.

According to some demonstrative embodiments, source module 102 may be located, for example, at a first location 160 ("location A"); source module 104 may be located, for example, at a second location 164 ("location B"); and/or source modules 106 and/or 108 may be located, for example, at a third location 168 ("location C"). Destination modules 110 and/or 112 may be located, for example, at location 164, e.g., in proximity to source module 104; destination module 114 may be located, for example, at a fourth location 166 ("location D"); and/or destination module 116 may be located, for example, at location 168, e.g., in proximity to source module 108.

According to some demonstrative embodiments, locations 160, 164, 166 and/or 168 may include, for example, different areas or rooms of a building, premises, plant, house, office, site and the like.

In one non-limiting example, location 160 may include a first area of an apartment, e.g., a living-room; location 166 may include a second area of the apartment, e.g., a first bedroom; location 168 may include a third area of the apartment, e.g., a second bedroom; and/or location 164 may include a fourth area of the apartment, e.g., a home-office area. For example, source module 102 may include an STB, source module 104 may include a PC, source module 106 may include a game console, and/or source module 108 may include a DVD. Destination module 110 may include, for example, a projector; destination module 112 may include, for example, a PC monitor; destination module 114 may include, for example, an LCD; and/or destination module 116 may include a plasma display.

According to some demonstrative embodiments, source modules of group 101 may be capable of performing downlink transmissions to destination modules of group 103. The downlink transmissions may include, for example, video information of signals 121, audio information control information, and/or any other suitable data. Destination modules of group 103 may be capable of performing uplink transmissions to source modules of group 101. The uplink transmissions may include, for example, control information audio information, and/or any other suitable data.

According to some demonstrative embodiments, the wireless communication between a source module of group 101 and destination module of group 103 may be performed according to a suitable wireless video transmission scheme. For example, the wireless video transmission scheme may include synchronizing between the transmission of a transmission frame and a video frame, e.g., as described below with reference to FIG. 3.

According to some demonstrative embodiments, the source modules of group 101 and the destination modules of group 103 perform communication of one or more communication types, e.g., as described below.

According to some demonstrative embodiments, at least one of the source modules of group 101 may be capable of performing a Point-To-Point (PTP) communication with a destination module of group 103, e.g., as described below. Although embodiments of the invention are not limited in this respect, the term "point to point" as used herein with relation to a communication may relate to a single video source module communicating with a single video destination module. For example, source module 108 may perform a PTP communication with destination module 116.

According to some demonstrative embodiments, at least one of the source modules of group 101 may be capable of transmitting a wireless video broadcast transmission, e.g., as described below. Although embodiments of the invention are not limited in this respect, the term "broadcast transmission" as used herein with relation to a source module may relate to the source module transmitting a transmission which may not be addressed to a specific destination module, and/or received by one or more destination modules of group 103.

According to some demonstrative embodiments, at least one of the source modules of group 101 may be capable of transmitting a multicast transmission to a subset of the destination modules of group 103, e.g., as described below. Although embodiments of the invention are not limited in this respect, the term "multicast transmission" as used herein with relation to a source module may relate to the source module transmitting a wireless video transmission to a selected subset of two or more destination modules. For example, source module 104 may transmit a multicast transmission to both destination modules 112 and 114.

According to some demonstrative embodiments, at least one of the destination modules of group 103 may be capable of performing a multipoint-to-point communication with two or more source modules of group 101. Although embodiments of the invention are not limited in this respect, the term "multipoint-to-point" as used herein with relation to a destination module may relate to the destination module capable of communicating with a set of two or more source modules, and selecting a source module of the set of source modules, from which to receive wireless video transmissions. For example, destination module may perform a multipoint-to-point communication with source modules 102, 104 and 106.

Although embodiments of the invention are not limited in this respect, the term "session" as used herein may relate to a communication between a source module and a destination module over a communication channel. The session may be initiated by an initiation message from one of the modules, followed by a wireless video transmission including video information, and ending at a release of the communication channel.

According to some demonstrative embodiments, each of the modules of groups 101 and 103 may be capable of transmitting and/or receiving wireless signals to/from any other module within a wireless range of the modules. However, in some demonstrative embodiments it may be desired to selectively enable one or more modules of groups 101 and/or 103 to identify and/or communicate with other modules of groups 101 and/or 103, e.g., based on an instruction received from one or more users of the modules.

According to some demonstrative embodiments, a module of groups 101 and 103 may be operated at one or more network states. For example, a module of groups 101 and 103 may switch between an "Unavailable" state, in which the module is not communicating and/or not available for communication, e.g., the module is at a power-down mode of operation; a "Standby" state, in which the module is not currently communicating, but the module is available for communication; and a "Connected" state, in which the module is performing a communication with one or more other modules. Two modules may be connected, for example, if one of the modules is in the Standby state and the other module performs a link setup, e.g., as described herein.

According to some demonstrative embodiments, the modules of groups 101 may be at one or more communication states with respect to the modules of groups 103. The communication states may include, for example, an un-registered state, a registered/un-associated state, an associated/un-authenticated state; and/or an engaged state, e.g., as described in detail below. In one example, a module of one of groups 101 and 103 may be at a plurality of, e.g., different, communication states with respect to a plurality of modules of another one of groups 101 and 103. For example, a source module of group 101 may be at an unregistered state with respect to at least one destination module of group 103; an un-associated state with respect to at least one destination module of group 103; an un-authenticated state with respect to at least one third destination module of group 103; and/or an engaged state with respect to at least one destination module of group 103. A source module of group 101 and a destination module of group 103 may switch between two communication states, for example, by performing one or more communication operations. The communication operations may include, for example, a registration operation, an un-registration operation, an association operation, a disassociation operation, and/or an authentication operation, e.g., as described in detail below.

Although embodiments of the invention are not limited in this respect, a registration operation between first and second wireless communication modules may include introducing, handshaking, acquainting, familiarizing, subscribing, and/or mating between the first and second modules, for example, by providing identification information and/or other registration information of the first module to the second module, and/or providing identification information and/or other registration information of the second module to the first module, e.g., in order to enable the first and second modules to identify one another, as described below. Accordingly, the first and second modules, may not be able to communicate with one another if, for example, the first and second devices are not registered with one another.

According to some demonstrative embodiments, the registration performed by a destination module with a source module may be analogous to associating a physical A/V input of a video destination module with a video source associated with the source module, e.g., via a wired connection.

According to some demonstrative embodiments, a wireless video communication module of groups 101 and/or 103 may be registered with one or more other wireless video communication modules of groups 101 and/or 103 for a relatively long time period, e.g., constantly and/or during a plurality of sessions. For example, the wireless video communication module may be registered with one or more wireless video communication modules, which are already registered with one another to form an active network.

According to some demonstrative embodiments, a wireless video communication module of groups 101 and/or 103 may be registered with one or more other wireless video communication modules of groups 101 and/or 103 for a relatively short time period, for example, during a single session. For example, the wireless video communication module may be registered with another wireless video communication module before a session with the other wireless video communication module, and perform an un-registration operation after the session. For example, a wireless video destination module of group 101, e.g., including a conference room projector, may be capable of performing a sequence of a registration operation, a communication session, and an un-registration operation, with each of a plurality of wireless video communication sources, for example, including one or more portable devices, e.g., laptops, which may be constantly changing with the inhabitants of the conference room.

Although embodiments of the invention are not limited in this respect, a registration operation may include establishing a communication channel or link between a source module and a destination module, e.g., as described below.

Although embodiments of the invention are not limited in this respect, an un-registration operation may include un-introducing and/or un-mating between first and second wireless communication modules, which are registered, e.g., in order to disable and/or prevent the first and second modules from communicating with each other. For example, a source module of group 101, e.g., a DVD in a parents' bedroom, and a destination module of group 103, e.g., a television in a children's bedroom, may be un-registered in order, for example, to prevent and/or disable communication between the source and destination modules.

According to some demonstrative embodiments, un-registering between first and second wireless video communication modules may include deleting the identification and/or other registration information from at least one of the modules and/or disabling access of at least one of the modules to the identification and/or other registration information of the other module. The un-registration operation between the first and second modules may be completed, for example, even if performed by only one of the modules, e.g., if only one of the modules delete the identification and/or other registration information related to the other module. In another example, un-registering between first and second wireless video communication modules may include inactivating the registration information of at least one of the modules. For example, the registration information corresponding to a module may include an "active/inactive" field, which may be activated when performing registration with the module, and de-activated when performing un-registration with the module.

According to some demonstrative embodiments, an un-registration operation may be invoked by a module ("the un-registering module"), which is to be un-registered from one or more other modules. For example, the un-registering module may send an un-registration message to the one or more other modules; and one or more of the other modules may delete the identification and/or other registration information related to the un-registering module. Additionally or alternatively, the un-registering module may delete the identification and/or other registration information related to the one or more other modules, e.g., with or without notifying the one or more other modules.

According to some demonstrative embodiments, a wireless video communication module of groups 101 and/or 103 may be registered with one or more other wireless video communication modules of groups 101 and/or 103 for a predefined period of time. For example, when performing a registration operation between a source module of group 101 and a destination module of group 103, at least one of the registering modules may define an expiration time period, after which an un-registration operation will be performed, for example, locally by each of the modules.

Although embodiments of the invention are not limited in this respect, an association operation may include establishing a communication channel or link between a source module and a destination module, e.g., as described below.

According to some demonstrative embodiments, the association operation may include, for example, defining and/or exchanging between the source and destination modules one or more link attributes and/or definitions, e.g., as described below. The association operation may include, for example, defining a type of the communication to be performed over the link, e.g., a PTP communication, a multicast communication, or a broadcast communication.

According to some demonstrative embodiments, an active network between two or more wireless video communication modules may be constructed and/or set up by performing at least one association operation. In one example, a source module of group 101 may perform an association operation to establish a communication link with a destination module of group 103. In another example, a destination module of group 103 may perform an association operation to establish a communication link with a source module of group 101. In a further example, a destination module of group 103 may perform an association operation to join an already existing communication link between a source module of group 101 and one or more other destination modules of group 103.

Although embodiments of the invention are not limited in this respect, a disassociation operation may include terminating a communication link between first and second wireless communication modules, which are associated, e.g., in order to disconnect the first and second wireless communication modules from one another and/or to disconnect at least one of the modules from an active network including the first and second modules. Although not limited in this respect, the term "active network" as used herein may relate to a connected group of a source module and a set of one or more destination modules being in communication with the source module during a certain time period. In one example, an active network may be terminated by a module performing a disassociating operation ("the disassociating module") if, for example, the disassociating module is a source module of the active network, and/or if the disassociating module is a destination module, and the active network includes only the destination module and a source module. In another example, the active network may not be terminated if, for example, the disassociating module is a destination module, and the active network includes one or more other destination modules.

Although embodiments of the invention are not limited in this respect, an authentication operation may include a first module authenticating a second module, and/or the second module authenticating the first module, for example, prior to performing a wireless video communication, e.g., in order to prevent communication with an unauthorized, undesired, or imposter module. For example, the authentication operation may be performed at the beginning of a session between a wireless video source module of group 101 and a wireless video destination module of group 103.

According to some demonstrative embodiments, the authentication operation may include an asymmetric key exchange of downlink and uplink session keys to be used by the source and destination modules to encrypt downlink and uplink transmissions, respectively, during the session, e.g., as described below.

According to some demonstrative embodiments, one or more wireless video communications between a source module of group 101 and a destination module of group 103 may be encrypted in order, for example, to protect information of the wireless communication against eavesdropping, e.g., to protect personal information, e.g., home movies, PC screens, and the like, from being exposed to unauthorized and/or undesired parties; and/or to obey content protection rules and/or Digital Rights Management (DRM) requirements.

In some demonstrative embodiments, the encryption may be based, for example, on an Advanced Encryption Standard (AES) block cipher, e.g., having keys of 256 or 128 bits, or any other suitable cipher. In some demonstrative embodiments, at least part of an uplink and/or downlink communication may be encrypted. In one non-limiting example, video information and/or control information of the wireless communication between modules of an active network may be encrypted, while header information may be either encrypted or un-encrypted, e.g., in order to allow other authorized modules to perform an association operation in order, for example, to join the active network.

In some demonstrative embodiments, one or more modules of groups 101 and 103, e.g., each module of group 101 and 103, may include a MAC address, e.g., a unique MAC address, and/or a device ID number, e.g., a unique device ID number, as described above; a public key, e.g., a unique public key, as described above; a private key, for example, any suitable private encryption key, e.g., a 64, 128, or 256 Byte private key; and/or a device identification string, e.g., device identification string, as described above.

In some demonstrative embodiments, the MAC address, the device ID number, and/or the public key of each of two modules performing an authentication operation may be known to one another. For example, the MAC address, the device ID number, and/or the public key of the two modules may be exchanged during the registration operation, e.g., as described herein.

In some demonstrative embodiments, the authentication operation performed by first and second modules may include, for example, the first module selecting, e.g., randomly or pseudo randomly, a first number, denoted $K_1$, for example, a 256 or 128 bit number. The first module may encrypt the number $K_1$ with the public key of the second module, and transmit the encrypted number to the second module. The second module may receive and decrypt the encrypted number, e.g., using the private key of the second module, to generate a value $K'_1$. The second module may encrypt the value $K'_1$ using the public key of the first module, and transmit the resulting encrypted value to the first module. The first module may decrypt the received value using the private key of the first module, to generate a value $K''_1$. The first module may determine the second module is authenticated if, for example, $K_1 = K''_1$. The first module may transmit to the second module an "Authentication Approved" message, e.g., if the second module is authenticated. The second module may select, e.g., randomly or pseudo randomly, a second number, denoted $K_2$, for example, a 256 or 128 bit number. The second module may encrypt the number $K_2$ with the public key of the first module, and transmit the encrypted number to the first module. The first module may receive and decrypt the encrypted number, e.g., using the private key of the first module, to generate a value $K'_2$. The first module may encrypt the value $K'_2$ using the public key of the second module, and transmit the resulting encrypted value to the second module. The second module may decrypt the received value using the private key of the second module, to generate a value $K''_2$. The second module may determine the first module is authenticated if, for example, $K_2=K''_2$. The second module may transmit to the first module an "Authentication Approved" message, e.g., if the first module is authenticated. The first module may use the value $K_1$ as an encryption key to encrypt transmissions to the second module, and/or second module may use the value $K_2$ as an encryption key to encrypt transmissions to the first module, e.g., after the first and second modules are authenticated.

In some demonstrative embodiments, a source module of group 101 performing a multicast communication with a plurality of destination modules of group 103 may implement a single downlink encryption key to commonly communicate with the plurality of destination modules; and the plurality of destination modules may implement a plurality of encryption keys, respectively, to communicate with the source module.

According to some demonstrative embodiments, a first module of one of groups 101 and 103 may establish a communication link with another second module of another of groups 101 and 103, for example, over an uncoordinated communication channel, e.g., as described below. Although embodiments of the invention are not limited in this respect, the term "uncoordinated communication channel" as used herein may relate to a wireless communication channel to be used by first and second communication modules, without the first and second communication modules informing one another, notifying one another, updating one another, announcing to one another, negotiating with one another, and/or conveying to one another, information identifying the communication channel, e.g., the frequency of the communication channel; and/or without or prior-to an arrangement and/or agreement of the first and second devices regarding the wireless communication channel, e.g., as part of a handshaking procedure.

According to some demonstrative embodiments, the first module may transmit a link initiation message over at least one free wireless communication channel; and wait, e.g., for a predefined time period, to receive a link acknowledgment message (ACK) from the second module over the free wireless communication link, e.g., as described below.

According to some demonstrative embodiments, the second module may search for a link initiation message, for example, by scanning one or more communication channels; and transmit to the first module the link acknowledgment message, for example, over the communication channel through which the link initiation message was received, e.g., as described below. The first and second modules may establish a communication over the free wireless communication channel used for exchanging the link initiation and link acknowledgment messages, e.g., as described below.

According to some demonstrative embodiments, at least one of first and second modules of groups 101 and 103 communicating over a communication channel may perform a link release operation, e.g., to disconnect the communication link. In one example, a source module may invoke the link release operation, for example, if the source module has no input video information to transmit. In another example, a destination module may invoke the link release operation, for example, if the destination module is not intended to receive transmissions from the source module, for example, when the destination module is to be turned off, or to perform over the air switching to switch to communicate with another source module, e.g., as described below. The link release operation may include, for example, sending a link-release message from the module invoking the link release. The link-release operation may also include releasing the communication channel, e.g., by ceasing, stopping, and/or refraining from transmission over the channel.

According to some demonstrative embodiments, a source module of group 101 may switch between first and second frequency channels of communication with a destination module of group 103. For example, a source module of group 101 may be in communication with a destination module of group 103 using a first frequency channel. The source module may switch to communicate with the destination module using a second frequency channel based on any suitable criterion, e.g., a degree of interference on the first and/or second frequency channel. In one example, the source module may switch to communicate with the destination module during a Virtual Blanking (VB) time period, e.g., as described below.

According to some demonstrative embodiments, before switching to the second frequency the source module may transmit to the destination module at least one wireless video frame over the first frequency channel. A header of the frame may include an indication of the second frequency channel, and an indication of a time at which the modules are to switch to the second transmission channel, e.g., as described in detail below.

According to some demonstrative embodiments, a module of one of groups 101 and 103 may perform over the air switching to selectively switch between communication with at least first and second modules of another of groups 101 and 103, e.g., as described below. Although not limited in this respect, the term "over the air switching" as used herein may relate, for example, to performing one or more operations to wirelessly switch a first wireless communication module from wirelessly communicating with a second wireless communication module to wirelessly communicating with a third wireless communication module.

In some demonstrative embodiments, a destination module of group 103 may switch between communicating with at least first and second source modules of group 101. For example, the destination module, e.g., module 114, may be in communication with a first source module, e.g., module 102, to receive wireless video transmissions during a first time period. The destination module may switch to communicate with a second source module, e.g., module 104, to receive wireless video transmissions during a second time period. The destination module may switch between the source modules based on any suitable criterion. In one example, the destination module may switch between the source modules based on an instruction from a user of the destination module, which may be received, for example, via interface 184.

In some demonstrative embodiments, a source module of group 101 may switch between communicating with at least first and second destination modules of group 103. For example, the source module, e.g., module 102, may be in communication with a first destination module, e.g., module 110, to transmit to the first destination module wireless video transmissions during a first time period. The source module may switch to communicate with a second destination module, e.g., module 114, to transmit to the second destination module wireless video transmissions during a second time period. The source module may switch between the destination modules based on any suitable criterion. In one example, the source module may switch between the destination modules based on an instruction from a user of the source module, which may be received, for example, via interface 181.

Figure 2:
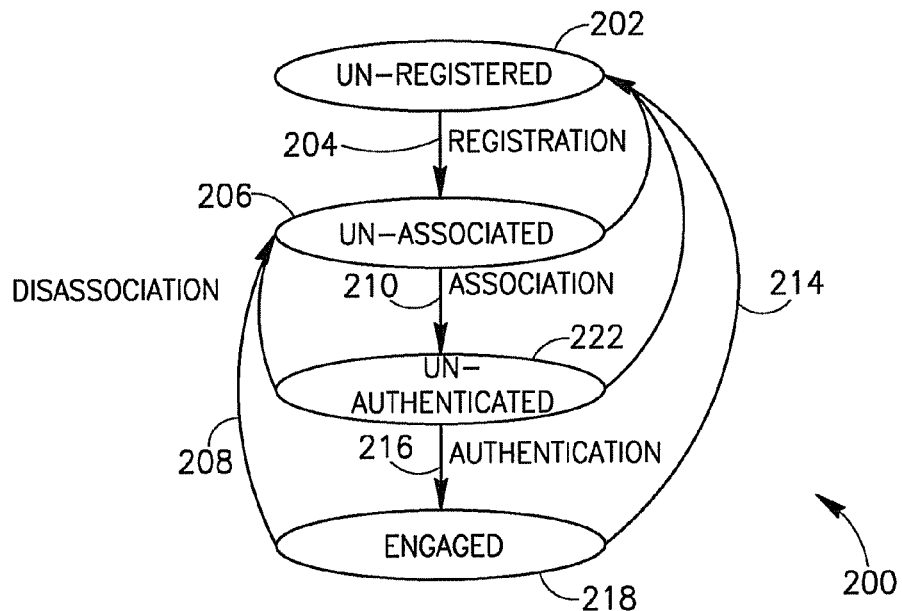
FIG. 2 is a schematic illustration of a sequence of communication states between a source module and a destination module, in accordance with some demonstrative embodiments.

Reference is now made to FIG. 2, which schematically illustrates a sequence 200 of communication states between a source module and a destination module, in accordance with some demonstrative embodiments. Although embodiments of the invention are not limited in this respect, in some demonstrative embodiments one or more of the states of sequence 200 may be implemented by one or more source modules of group 101 (FIG. 1) and one or more destination modules of group 103 (FIG. 1).

According to some demonstrative embodiments, a source module and a destination module may be at an un-registered communication state 202 with respect to one another. When at un-registered state 202, the source and destination modules may be allowed to perform a registration operation 204, e.g., as described in detail below. In some embodiments, the source and destination modules may be allowed to perform a broadcast communication, e.g., as described above, for example, even when at un-registered state 202.

According to some demonstrative embodiments, the source and destination modules may switch from un-registered state 202 to a registered/un-associated state 206, for example, by performing registration operation 204, e.g., as described below. When at registered/un-associated state 206 the source and destination modules may be allowed to perform an association operation 210, e.g., as described in detail below; and/or to perform a broadcast communication, e.g., as described above. The source and destination modules may switch from registered/unassociated state 206 back to un-registered state 202, for example, by performing an un-registration operation 214, e.g., as described below.

According to some demonstrative embodiments, the source and destination modules may switch from registered/un-associated state 206 to an associated/un-authenticated state 212, for example, by performing association operation 210, e.g., as described below. When at associated/un-authenticated state 212 the source and destination modules may be allowed to perform an authentication operation 216, e.g., as described in detail below; and/or to perform a broadcast communication, e.g., as described above. The source and destination modules may switch from associated/unauthenticated state 212 back to un-registered state 202, for example, by performing un-registration operation 214; and/or back to registered/un-associated state 206, for example, by performing a disassociation operation 208, e.g., as described below.

According to some demonstrative embodiments, while at un-registered state 204, registered/un-associated state 206 or associated/un-authenticated state 212, the source and destination modules may be allowed to communicate wireless video transmissions only via a broadcast communication.

According to some demonstrative embodiments, the source and destination modules may switch from associated/un-authenticated state 212 to an authenticated/engaged state 218, for example, by performing authentication operation 216, e.g., as described below. When at authenticated/engaged state 216 the source and destination modules may be allowed to perform any suitable wireless video communication with one another, e.g., as described above. The source and destination modules may switch from authenticated/engaged state 216 back to un-registered state 202, for example, by performing un-registration operation 214; and/or back to registered/ un-associated state 206, for example, by performing a disassociation operation 208, e.g., as described below.

Figure 3:
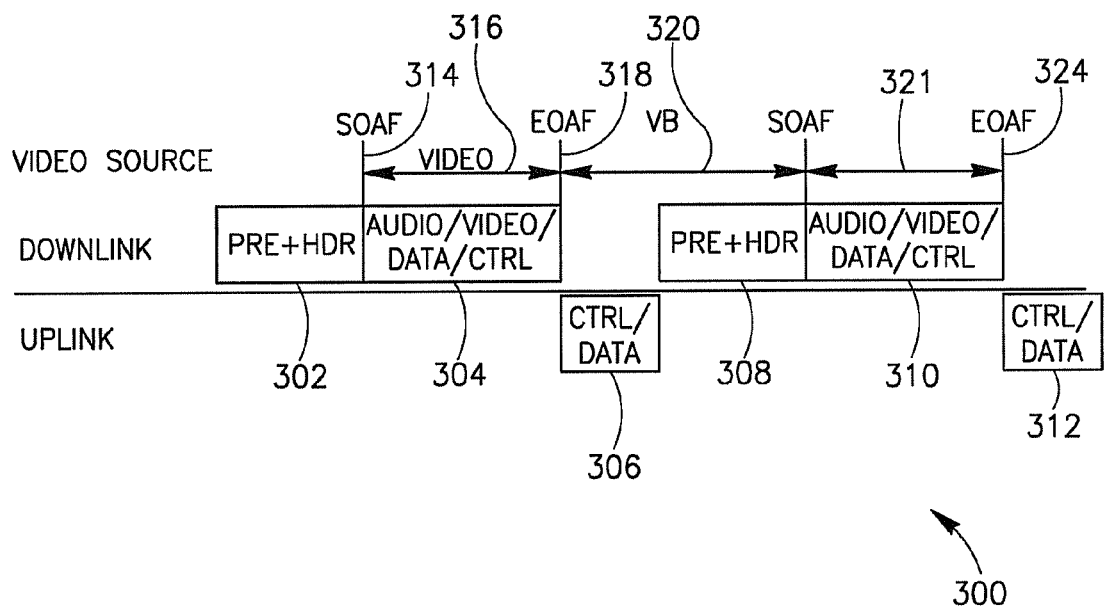
FIG. 3 is a schematic illustration of a wireless video transmission scheme, in accordance with some demonstrative embodiments.

Reference is now made to FIG. 3, which schematically illustrates a wireless video transmission scheme 300, in accordance with some demonstrative embodiments. Although embodiments of the invention are not limited in this respect, in some demonstrative embodiments transmission scheme 300 may be implemented by a source module, e.g., a source module of group 101 (FIG. 1), to communicate with a destination module, e.g., a destination module of group 103 (FIG. 1).

According to some demonstrative embodiments, transmission scheme 300 may be implemented to synchronize between a plurality of video frames and a plurality of wireless transmissions corresponding to the video frames, e.g., as described below.

As shown in FIG. 3, a first video frame 316 may begin at a time 314, denoted, "Start Of Active Frame" (SOAF), and end at a time 318, denoted "End Of Active Frame (EOAF). A second video frame 321 may begin at a time 322, which may be separated from time 318 by a VB time period 320; and end at a time 324.

In some demonstrative embodiments, a downlink transmission from a source module to a destination module may include a first downlink transmission frame, which may include a preamble/header 302, and video information 304 corresponding to video frame 316; followed by a second downlink transmission frame, which may include a preamble/header 308, and video information 310 corresponding to video frame 324. Preamble/header 302 may be transmitted during a VB between a video frame, which precedes frame 316, and frame 316; and video information 304 may be transmitted during the time period between times 314 and 318. Preamble/header 308 may be transmitted during VB time period 320; and video information 310 may be transmitted during the time period between times 322 and 324.

In some demonstrative embodiments, an uplink transmission from the destination module to the source module may include first control information 306 and second control information 312 corresponding to video frames 316 and 321, respectively. Control information 306 may be transmitted during VB period 318, e.g., before preamble 308 is transmitted. Control information 312 may be transmitted during a VB period between frame 312 and a video frame, which succeeds frame 321, e.g., before a preamble corresponding to the succeeding video frame is transmitted.

Figure 4:
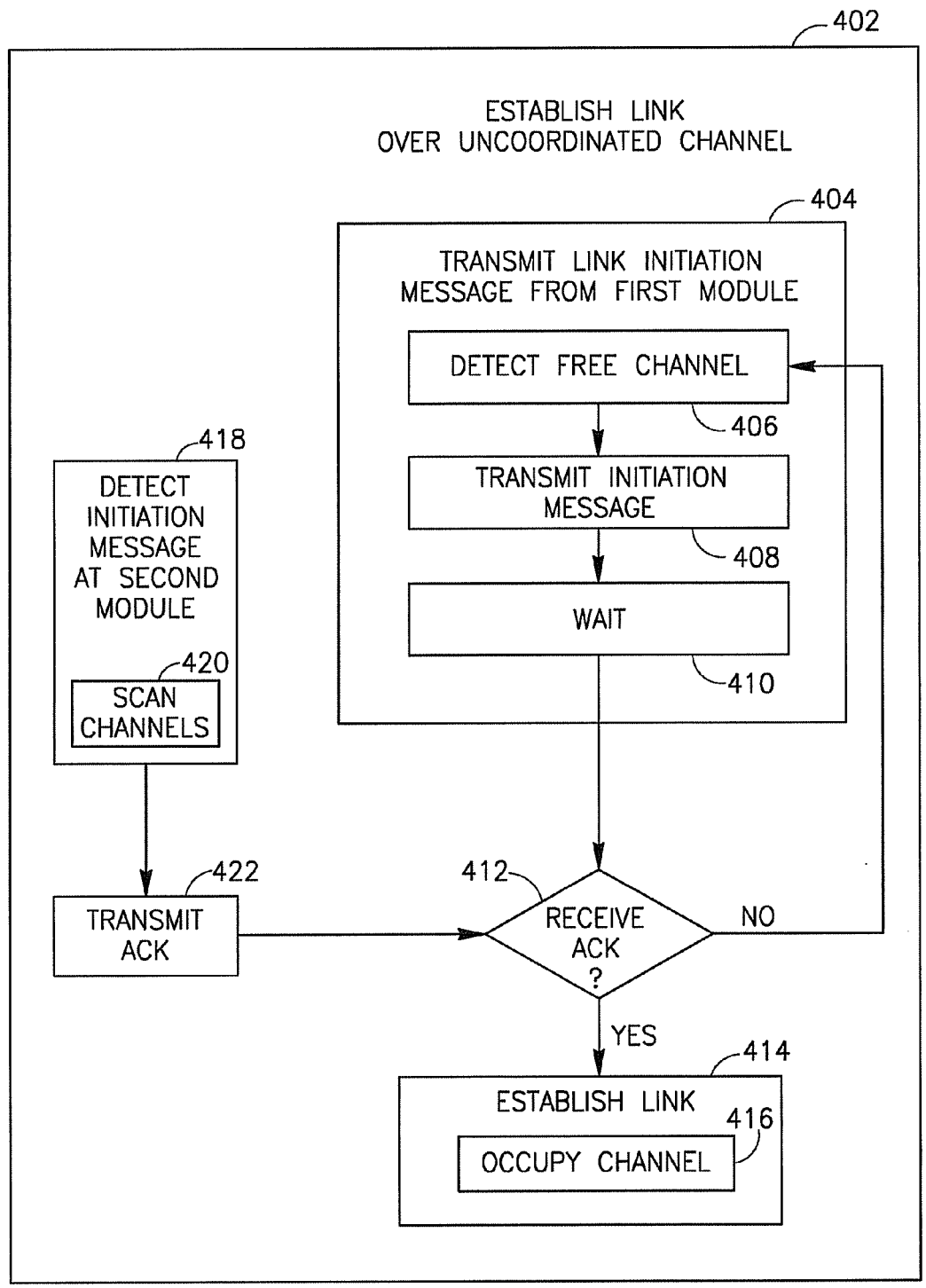
FIG. 4 is a schematic flow-chart illustration of a method of establishing a wireless communication link between wireless video communication modules, in accordance with some demonstrative embodiments.

Reference is now made to FIG. 4, which schematically illustrates a method of establishing a wireless communication link between two wireless video communication modules, in accordance with some demonstrative embodiments. Although embodiments of the invention are not limited in this respect, according to some demonstrative embodiments one or more operations of the method of FIG. 4 may be performed by first and second wireless video communication modules. For example, one of the first and second wireless video modules may include a wireless video source module, e.g., a source module of group 101 (FIG. 1); and another of the first and second wireless video modules may include a wireless video destination module, e.g., a destination module of group 103 (FIG. 1).

As indicated at block 402, the method may include establishing a wireless communication link between first and second wireless video communication modules over an uncoordinated communication channel. For example, a source module of group 101 (FIG. 1) and a destination module of group 103 (FIG. 1) may establish a communication link over an uncoordinated communication channel.

As indicated at block 404, establishing the communication link may include transmitting from the first module a link initiation message over at least one free communication channel, e.g., as described below. The link initiation message may include, for example, a link-type of the required link to be established, e.g., a registration link, or an association link, as are described above.

As indicated at block 418, establishing the communication link may include detecting the link initiation message at the second module, e.g., as described below.

As indicated at block 422, establishing the communication link may include transmitting an acknowledgment message from the second module to the first module over the free communication channel.

As indicated at block 412, establishing the communication link may include receiving at the first module a link acknowledgment message from the second module over the free communication channel.

As indicated at block 406, transmitting the link initiation message over the at least one free communication channel may include detecting a free communication channel. For example, the first module may scan a plurality of communication channels to detect the free communication channel.

As indicated at block 408, transmitting the link initiation message over the at least one free communication channel may also include transmitting the link initiation message over the detected communication channel. For example, the first module may transmit the link initiation message over the detected free channel.

As indicated at block 410, transmitting the link initiation message over the at least one free communication channel may also include waiting for a predefined waiting time period to receive a link acknowledgment message over the detected communication channel. The waiting time period may be related, for example, to a number of the plurality of communication channels, denoted N, and/or to a scan time period required for the second module to scan a channel. For example, the waiting time period may be equal to or longer than a product of the number of channels and the scan time. In one example, the waiting time period may be at least 50 milliseconds if, for example, N=50 channels, and the scan time is one millisecond.

As indicated at block 412, the method may include repeating the detecting, transmitting and waiting for one or more other communication channels, e.g., until receiving the link acknowledgment message.

As indicated at block 420, detecting the link initiation message may include scanning the plurality of communication channels. For example, the second module may scan the plurality of N communication channels to detect the initiation transmission.

As indicated at block 414, establishing the communication link may include establishing the communication link over the free channel. As indicated at block 316, establishing the communication link may include occupying the communication channel by at least one of the first and second modules.

In one example, one or more operations of the method of FIG. 4 may be implemented to establish a point-to-point communication link between a first initiating module ("master") and a second module ("slave"), e.g., as described below.

In some demonstrative embodiments, the master may search for a free channel, send a link initiation message over the free channel, and wait for an acknowledgment message, e.g., as described above. If no acknowledgment message is received, the master may repeat searching for the free channel, sending the link, and waiting, e.g., as described above. The master may occupy the channel, e.g., upon receiving the acknowledgment message. The slave may scan channels searching for an initiation message intended for the slave; and transmit the acknowledgment message, e.g., upon reception of the initiation message intended for the slave, e.g., as described above.

In another example, one or more operations of the method of FIG. 4 may be implemented to establish a multicast communication link, e.g., as described below.

In some demonstrative embodiments, the master may include a source module and the slave may include a destination module. According to these embodiments, the master may search for a free channel, send a link initiation message over the free channel, and wait for an acknowledgment message, e.g., as described above. If no acknowledgment message is received, the master may repeat searching for the free channel, sending the initiation message, and waiting, e.g., as described above. The master may occupy the channel, e.g., upon receiving the acknowledgment message. The slave may scan channels searching for an initiation message intended for the slave; and transmit the acknowledgment message, e.g., upon reception of the initiation message intended for the slave, e.g., as described above.

In some demonstrative embodiments, the master may include a destination module and the slave may include a source module. In one example, the slave source module may be part of an active network, e.g., with one or more other destination modules, and the master destination module may join the active network, e.g., as part of an association operation.

In some demonstrative embodiments, the master destination module may scan a plurality of channels to detect an active transmission from the slave source module. If such a transmission is not detected, the master destination module may search for a free channel, transmit a link initiation message to the slave source module, and wait for an acknowledgment message, e.g., as described above. The master destination module may repeat searching for a free channel, and transmitting the link initiation message over the free channel, e.g., if no acknowledgment has been received. The master destination module may repeat the scanning to detect an active transmission from the slave source module, e.g., after a predefined time period. The master destination module may occupy the channel, e.g., upon receiving the acknowledgment message, as described above. The slave source module may scan a plurality of communication channels to detect the link initiation message from the master, for example, during a time period in which the source module is not performing a transmission, e.g., during a VB period. The slave source module may transmit the acknowledgment message, e.g., upon reception of the link initiation message, as described above.

In yet another example, one or more operations of the method of FIG. 4 may be implemented to establish a broadcast communication link, e.g., as described below.

In some demonstrative embodiments, the master may include a source module and the slave may include a destination module. The master may search for a free channel, and occupy the channel. The slave may scan a plurality of communication channels to detect a valid transmission, e.g., from the master.

Figure 5A:
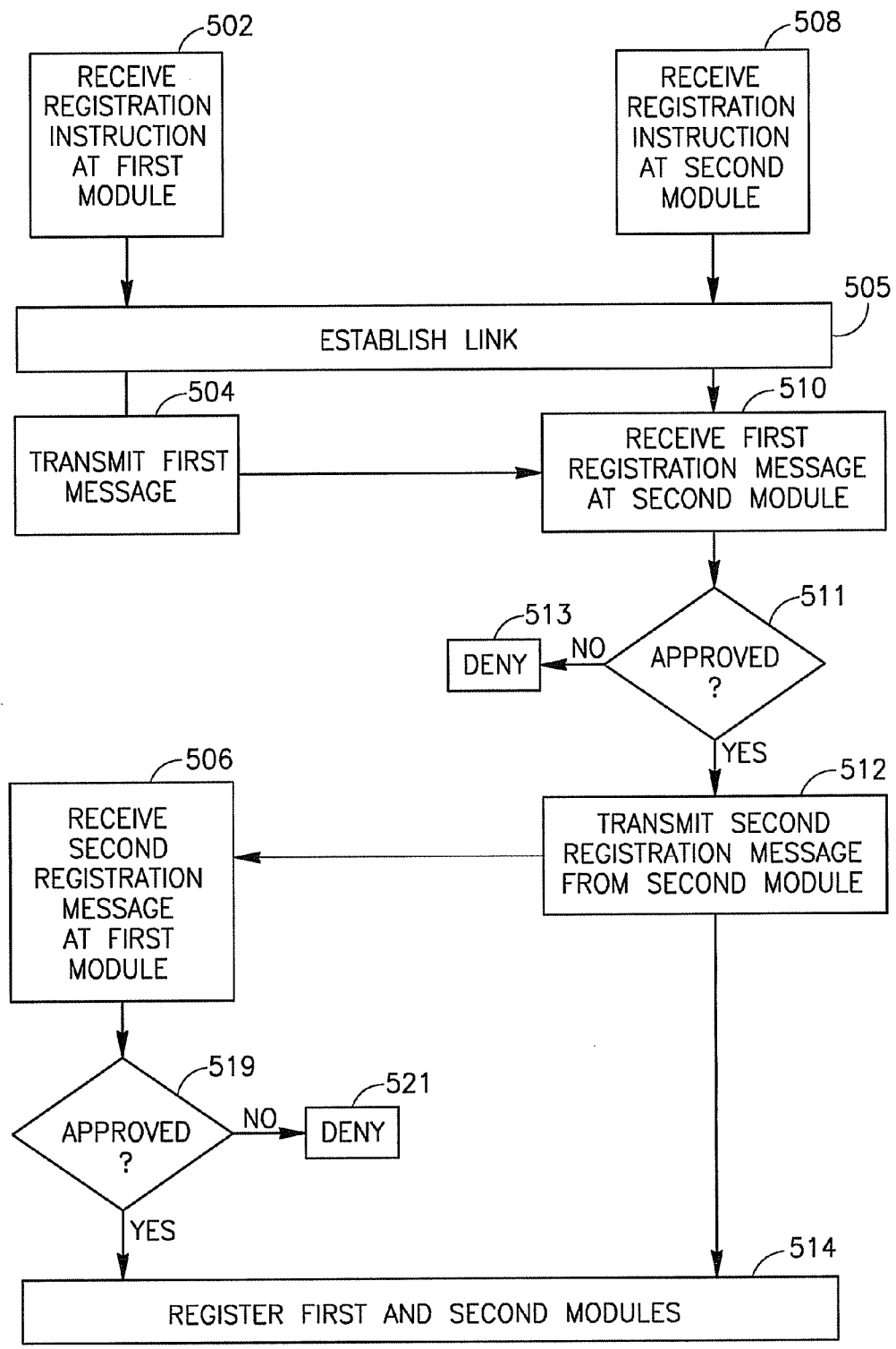
FIG. 5A is a schematic flow-chart illustration of a method of registering wireless video communication modules, in accordance with some demonstrative embodiments.

Reference is now made to FIG. 5A, which schematically illustrates a method of registering two wireless video communication modules, in accordance with some demonstrative embodiments. Although embodiments of the invention are not limited in this respect, according to some demonstrative embodiments one or more operations of the method of FIG. 5A may be performed by first and second wireless video communication modules, e.g., a source module of group 101 (FIG. 1) and a destination module of group 103 (FIG. 1), for example to register the first and second wireless video communication modules with one another.

As indicated at block 502, the method may include receiving by the first module a registration instruction, e.g., from a user of the first module. For example, the first module may receive the registration instruction via a user interface. In one example, source module 102 (FIG. 1) may receive a registration instruction from a user of source module 102 (FIG. 1) via user interface 181 (FIG. 1), e.g., via input 182 (FIG. 1). For example, if input 182 (FIG. 1) includes a register button, e.g., as described above with reference to FIG. 1, then the user of source module 102 (FIG. 1) may press the register button.

As indicated at block 508, the method may include receiving by the second module a registration instruction, e.g., from a user of the second module. For example, the second module may receive the registration instruction via a user interface. In one example, destination module 110 (FIG. 1) may receive a registration instruction from a user of destination module 110 (FIG. 1) via user interface 184 (FIG. 1), e.g., via input 185 (FIG. 1). For example, if input 185 (FIG. 1) includes a register button, e.g., as described above with reference to FIG. 1, then the user of destination module 110 (FIG. 1) may press the register button.

As indicated at block 505, the method may also include establishing a communication link between the first and second modules ("the registration link"). For example, modules 102 (FIG. 1) and 110 (FIG. 1) may establish a communication link at a registration mode, e.g., as described above with reference to FIG. 4.

As indicated at block 504, the method may also include transmitting a first registration message from the first module. The first registration message may include, for example, first information sufficient for identifying the first module by the second module, e.g., as described above. For example, source module 102 (FIG. 1) may transmit a registration message, including the MAC address and/or device ID number of source module 102 (FIG. 1), to destination module 110 (FIG. 1).

In some demonstrative embodiments, transmitting the first registration message may include transmitting the first registration message within a predefined time period after receiving the instruction from the user of the first module, e.g., as described below.

As indicated at block 510, the method may include receiving the first registration message at the second module. For example, destination module 110 (FIG. 1) may receive the first registration message, e.g., via the established registration link.

As indicated at block 511, in some demonstrative embodiments, the second module may selectively approve performing the registration operation, e.g., based on the identity of the first module. For example, the second module may include a list of approved modules, e.g., which may be identified based on the MAC address and/or device ID number; and/or types of modules for communication. The list of approved modules may be defined and/or updated, for example, by the user of the second module, e.g., via interface 184 (FIG. 1). For example, the user may define and/or update the list of approved modules, through the user interface, based on user knowledge of IDs of modules to be registered. As indicated at block 513, the method may include denying the registration operation by the second module. For example, destination module 110 (FIG. 1) may transmit to source module 102 (FIG. 1) a denial message, e.g., if source module 102 (FIG. 1) is not approved for registering with destination module 110 (FIG. 1).

As indicated at block 512, the method may also include transmitting a second registration message from the second module, e.g., if the first module is approved for registering with the second module. The second registration message may include, for example, second information sufficient for identifying the second module by the first module, e.g., as described above. For example, destination module 110 (FIG. 1) may transmit a registration message, including the MAC address and/or device ID number of destination module 110 (FIG. 1), to source module 102 (FIG. 1).

In some demonstrative embodiments, transmitting the second registration message may include transmitting the second registration message within a predefined time period after receiving the instruction from the user of the second module, e.g., as described below.

As indicated at block 506, the method may include receiving the second registration message at the first module. For example, source module 102 (FIG. 1) may receive the second registration message, e.g., via the established registration link.

As indicated at block 519, in some demonstrative embodiments, the first module may selectively approve performing the registration operation, e.g., based on the identity of the second module. For example, the first module may include a list of approved modules, e.g., which may be identified based on the MAC address and/or the device ID number; and/or types of modules for communication. The list of approved modules may be defined and/or updated, for example, by the user of the first module, e.g., via interface 181 (FIG. 1). For example, the user may define and/or update the list of approved modules, through the user interface, based on user knowledge of IDs of modules to be registered. As indicated at block 521, the method may include denying the registration operation by the first module. For example, source module 102 (FIG. 1) may transmit to destination module 110 (FIG. 1) a denial message, e.g., if destination module 110 (FIG. 1) is not approved for registering with source module 102 (FIG. 1).

As indicated at block 514, the method may also include registering the first and second modules based on the first and second registration messages. For example, source module 102 (FIG. 1) and destination module 110 (FIG. 1) may be registered based on the first and second registration messages. In one example, the first module may store the second information identifying the second module; and the second module may store the first information identifying the first module. In one example, source module 102 (FIG. 1) may update registration information 199 (FIG. 1), based on the second registration message to include, for example, the registration information, e.g. MAC address and/or device ID number, and public key, of destination module 110 (FIG. 1); and destination module 110 (FIG. 1) may update registration information 197 (FIG. 1), based on the first registration message to include, for example, the registration information, e.g., MAC address and/or device ID number and public key, of source module 102 (FIG. 1).

In some demonstrative embodiments, an indication may be provided to the users of the first and/or second modules, e.g., during one or more operations of the method of FIG. 1, e.g., as described below.

In some demonstrative embodiments, inputs 182 (FIG. 1) and 185 (FIG. 1) may include first and second register buttons, respectively; and indicators 183 (FIG. 1) and 186 (FIG. 1) may include first and second LEDs. A user of source module 102 (FIG. 1) may press the register button of source module 102 (FIG. 1), and the LED of source module 102 (FIG. 1) may flicker for a first predefined time period, e.g., up to one minute at a flicker rate of, e.g., 3 Hertz (Hz), and a 50% duty cycle. The user of destination module 110 (FIG. 1) may press the register button of module 110 (FIG. 1), e.g., during the first time period, and the LED of destination module 110 (FIG. 1) may flicker for a second predefined time period, e.g., up to one minute at a flicker rate of, e.g., 3 Hertz (Hz), and a 50% duty cycle. The LEDs of both source module 102 (FIG. 1) and destination module 110 (FIG. 1) may indicate that the registration operation is being performed. For example, the LEDs of both source module 102 (FIG. 1) and destination module 110 (FIG. 1) may flicker in a synchronized manner, for example, at a flickering rate of 0.5 Hz, and 50% duty cycle, e.g., for four seconds. The LEDs of both source module 102 (FIG. 1) and destination module 110 (FIG. 1) may indicate that the registration operation has been completed successfully. For example, LEDs of both source module 102 (FIG. 1) and destination module 110 (FIG. 1) may be lit constantly.

Figure 5B:
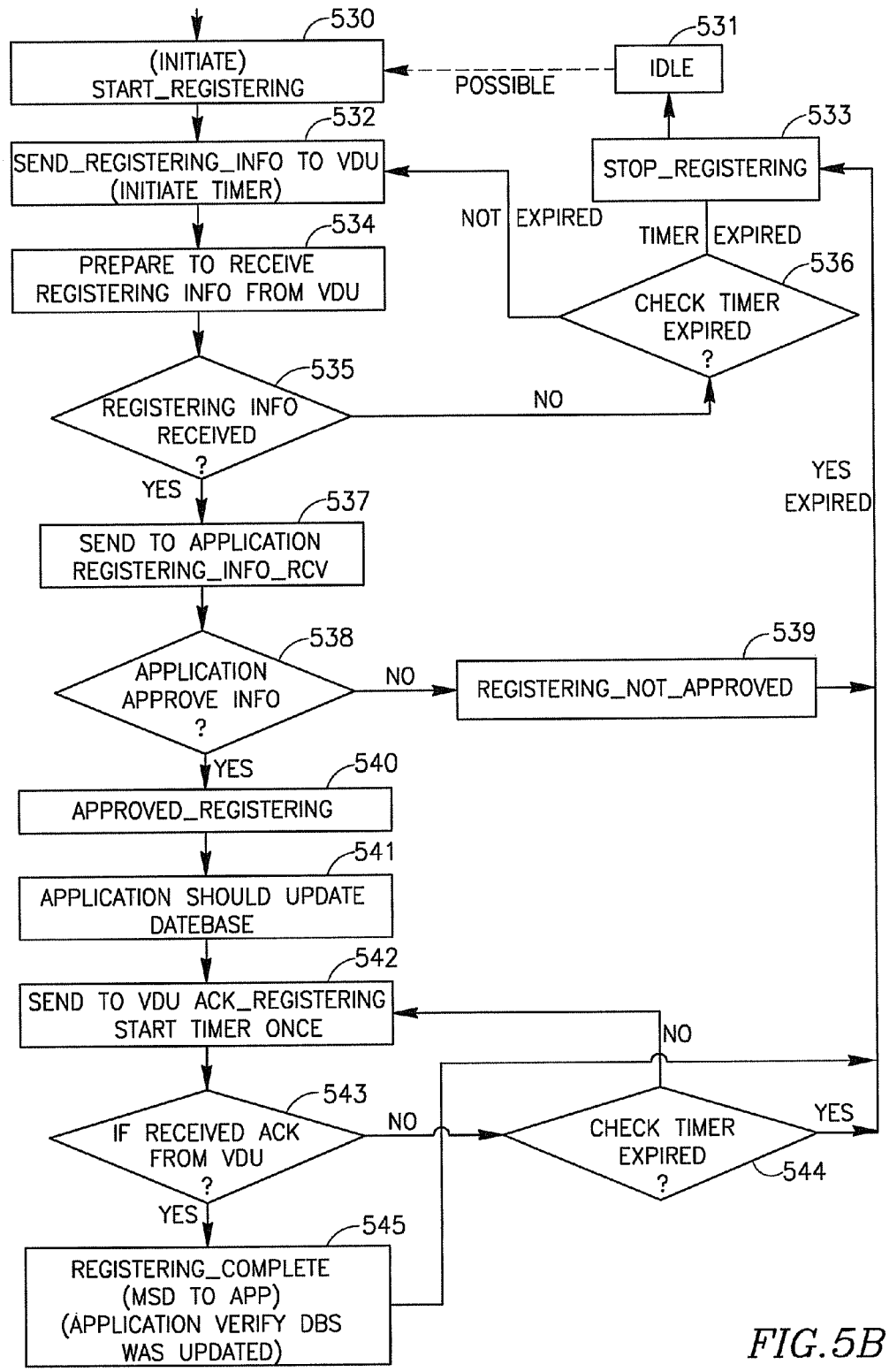
FIG. 5B is a schematic flow-chart illustration of a method of registering a video source module (VSU) with a video destination module (VDU) in accordance with some demonstrative embodiments.

Reference is made to FIG. 5B, which schematically illustrates a flow chart of registering a video source module (VSU) with a video destination module (VDU) in accordance with some demonstrative embodiments. Although embodiments of the invention are not limited in this respect, in some demonstrative embodiments one or more operations of FIG. 5B may be performed by at least one of modules 102, 104, 106 and 108 (FIG. 1), e.g., as part of the method of FIG. 5A.

As indicated at block 530, the method may include initiating the registration operation by the VSU. Initiating the registration operation may include, for example, transferring an initiation instruction, e.g., in the instruction "START_REGISTERING", from an application layer of the VSU to a MAC layer of the VSU. As indicated at block 531, the VSU may initiate the registration operation from an IDLE state of communication. In one example, the VSU may perform a de-association operation, e.g., if the VSU is at an authenticated/associated state, e.g., as described above. The VSU my also check a status of the communication link, e.g., prior to initiating the registration operation.

As indicated at block 532, the method may include transmitting a first registration message to the VDU ("the VSU registration message"), e.g., as described above. The method may also include initiating an expiration timer, for example, upon transmitting the registration message, e.g., as described above.

As indicated at block 534, the method may also include waiting to receive a registration message from the VDU ("the VDU registration message"), for example, in response to the VSU registration message, e.g., as described above.

As indicated at block 535, the method may include checking whether the VDU registration message has been received. The method may include checking whether the expiration timer has timed out, as indicated at block 536. As indicated at block 533, the method may include terminate the registration operation, e.g., if the expiration timer has timed out. The method may include re-sending the VSU registration message, e.g., if the expiration timer has not timed out.

As indicated at block 537, the method may include transferring registration information of the VDU to the application layer, e.g., in the form of a "REGISTRATION_INFO_RCV" message, which may include registration information included in the VDU registration message, as described above.

As indicated at block 538, the method may include selectively approving the registration information of the VDU. For example, the application layer may selectively approve the registration information of the VDU, e.g., as described above.

As indicated at block 539, the method may include not approving the registration operation, e.g., if the registration information of the VDU is not approved. For example the MAC layer of the VSU may receive from the application layer a "REGISTRATION-NOT_APPROVED" message. As indicated at block 533, the registration operation may be terminated.

As indicated at block 540, the method may include approving the registration operation, e.g., if the registration information of the VDU is approved. For example the MAC layer of the VSU may receive from the application layer a "REGISTRATION_APPROVED" message.

As indicated at block 541, the method may include updating the registration information of the VSU to include the registration information of the VDU. For example the application layer of the VSU may update registration information 199 (FIG. 1), e.g., as described above.

As indicated at block 542, the method may include transmitting to the VDU an acknowledgment message. The method may also include initiating an expiration timer, for example, upon transmitting the acknowledgment message.

As indicated at block 543, the method may also include detecting an acknowledgment message from the VDU. As indicated at block 544, the method may include determining whether the expiration timer has timed out, e.g., if the acknowledgement message has not been received from the VDU. The method may include terminating the registration operation, e.g., if the expiration timer has timed out and no acknowledgment was received from the VDU. The method may include re-transmitting to the VDU an acknowledgment message, e.g., if the expiration timer has not timed-out.

As indicated at block 545, the method may include completing the registration operation, e.g., upon receiving the acknowledgement message from the VDU. For example, the MAC layer of the VSU may transfer to the application layer a "REGISTERING_COMPLETE" message.

Figure 5C:
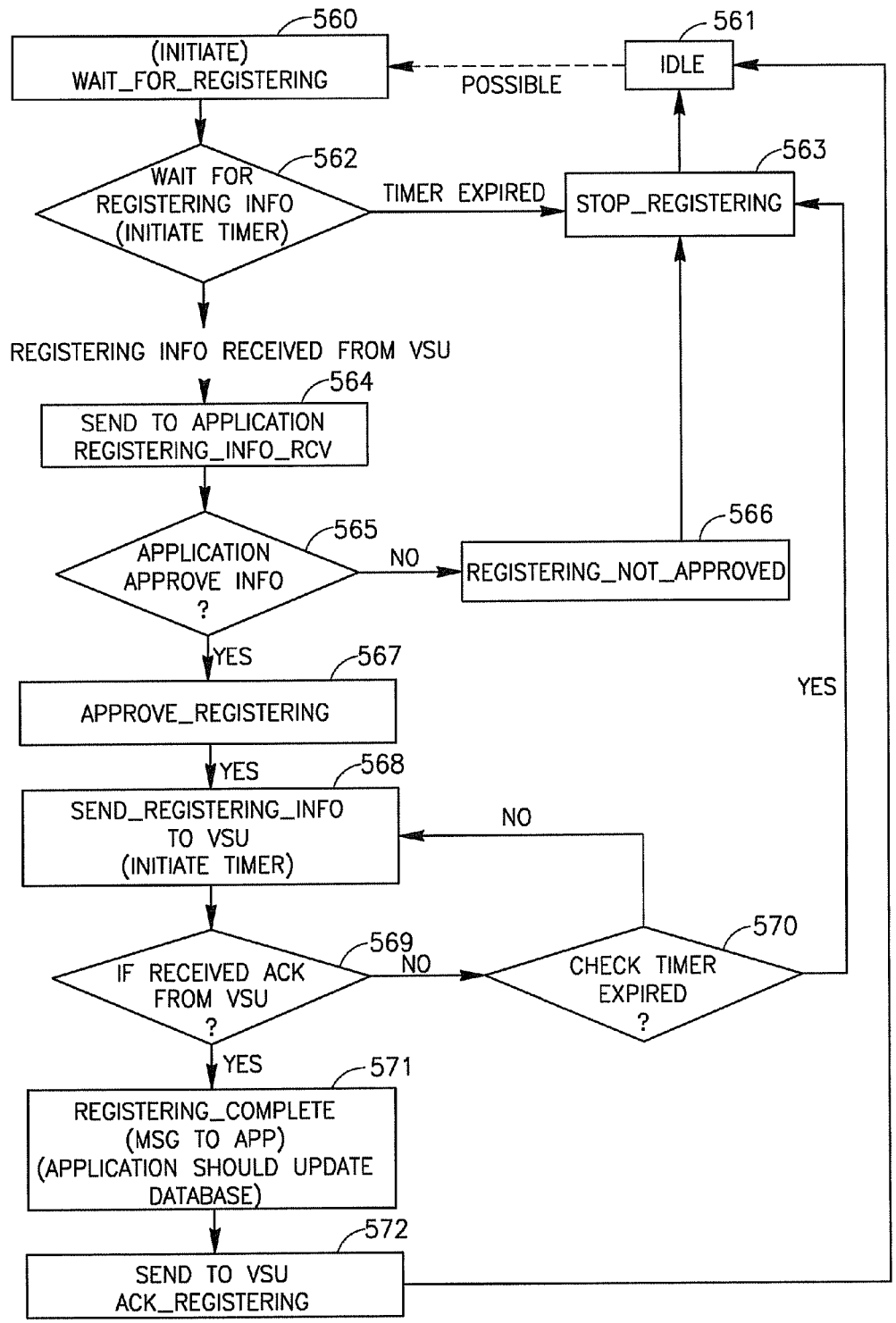
FIG. 5C is a schematic flow-chart illustration of a method of registering a VDU with a VSU, in accordance with some demonstrative embodiments.

Reference is made to FIG. 5C, which schematically illustrates a flow chart of registering a VDU with a VSU in accordance with some demonstrative embodiments. Although embodiments of the invention are not limited in this respect, in some demonstrative embodiments one or more operations of FIG. 5C may be performed by at least one of modules 110, 112, 114 and 116 (FIG. 1), e.g., as part of the method of FIG. 5A.

As indicated at block 560, the method may include initiating a registration operation. Initiating the registration operation may include, for example, transferring a waiting instruction, e.g., in the instruction "WAIT_FOR_REGISTERING", from an application layer of the VDU to a MAC layer of the VDU. As indicated at block 561, the VDU may wait for the registration message when at an IDLE state of communication.

As indicated at block 562, the method may include detecting a registration message from the VSU ("the VSU registration message"). The method may also include initiating an expiration timer, for example, upon receiving waiting instruction.

As indicated at block 563, the method may include terminating the registration operation, e.g., if the expiration timer has timed out, and the VSU registration message has not been received.

As indicated at block 564, the method may include transferring registration information of the VSU to the application layer, e.g., in the form of a REGISTRATION_INFO_RCV" message, which may include registration information included in the VSU registration message, as described above.

As indicated at block 565, the method may include selectively approving the registration information of the VSU. For example, the application layer may selectively approve the registration information of the VSU, e.g., as described above.

As indicated at block 566, the method may include not approving the registration operation, e.g., if the registration information of the VSU is not approved. For example the MAC layer of the VDU may receive from the application layer a "REGISTRATION-NOT_APPROVED" message. As indicated at block 563, the registration operation may be terminated.

As indicated at block 567, the method may include approving the registration operation, e.g., if the registration information of the VSU is approved. For example the MAC layer of the VDU may receive from the application layer a "REGISTRATION_APPROVED" message.

As indicated at block 568, the method may include transmitting a registration message to the VSU ("the VDU registration message"), e.g., as described above. The method may also include initiating an expiration timer, for example, upon transmitting the registration message, e.g., as described above.

As indicated at block 569, the method may also include waiting to receive an acknowledgment from the VSU, for example, in response to the VDU registration message, e.g., as described above. As indicated at block 570, the method may include determining whether the expiration timer has timed out, e.g., if the acknowledgement message has not been received from the VSU. The method may include terminating the registration operation, e.g., if the expiration timer has timed out and no acknowledgment was received from the VSU. The method may include re-transmitting to the VSU an acknowledgment message, e.g., if the expiration timer has not timed-out.

As indicated at block 571, the method may include completing the registration operation, e.g., upon receiving the acknowledgement message from the VSU. For example, the MAC layer of the VDU may transfer to the application layer a "REGISTERING_COMPLETE" message.

As indicated at block 572, the method may include transmitting to the VSU an acknowledgment message.

Figure 6:
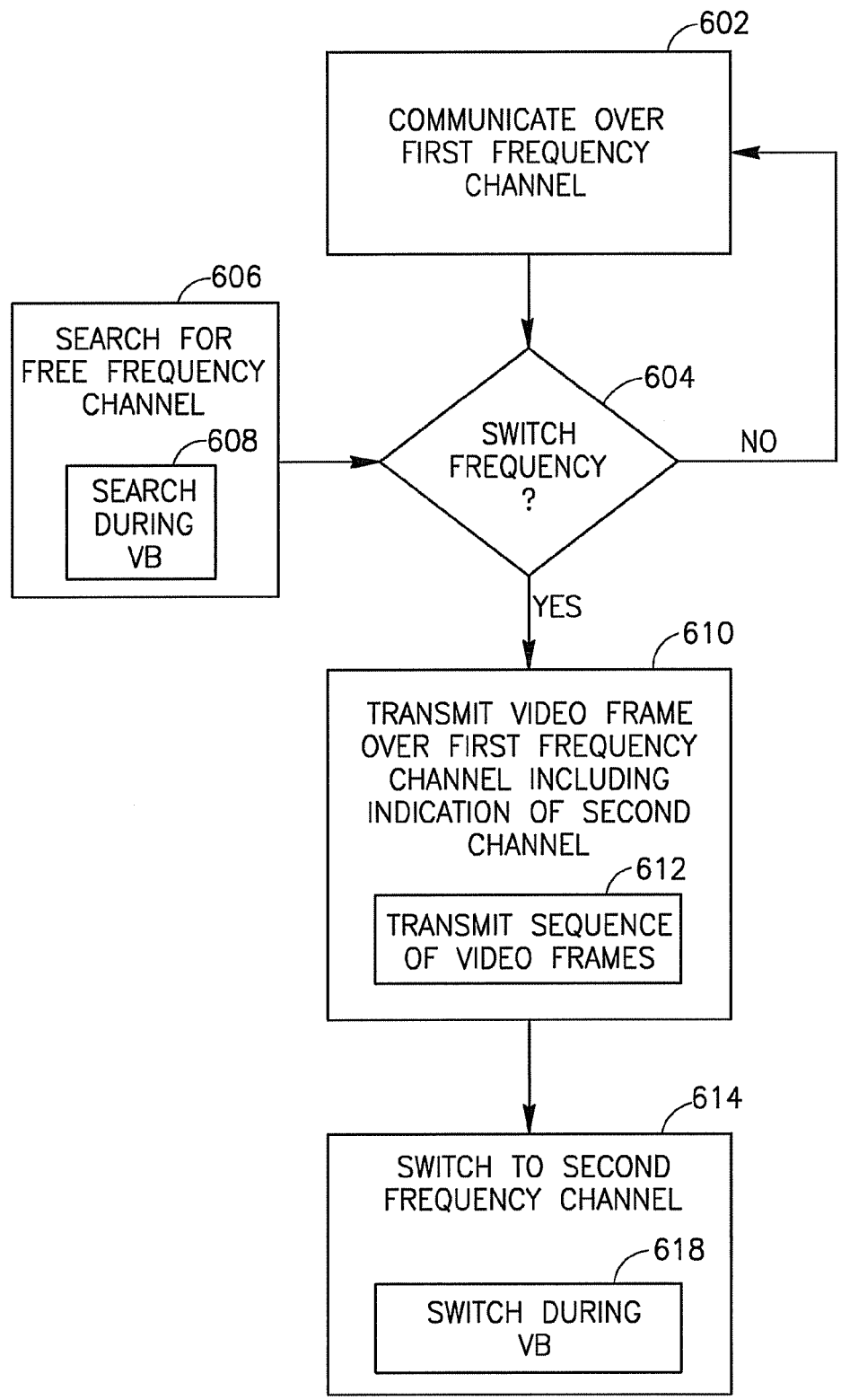
FIG. 6 is a schematic flow-chart illustration of a method of switching between frequency channels of communication between wireless video communication modules, in accordance with some demonstrative embodiments.

Reference is now made to FIG. 6, which schematically illustrates a method of switching between frequency channels of communication between two wireless video communication modules, in accordance with some demonstrative embodiments. Although embodiments of the invention are not limited in this respect, according to some demonstrative embodiments one or more operations of the method of FIG. 6 may be performed by first and second wireless video communication modules, e.g., a source module of group 101 (FIG. 1) and a destination module of group 103 (FIG. 1).

As indicated at block 602, the method may include communicating wireless transmissions between the first and second modules over a first frequency channel. For example, source module 102 (FIG. 1) may transmit downlink wireless transmissions including video information to destination module 110 (FIG. 1), e.g., as described above.

As indicated at block 604, the method may include determining whether to switch from the first frequency channel to another frequency channel, e.g., based on any suitable criterion. Although embodiments of the invention are not limited in this respect, in some demonstrative embodiments the first and/or second modules may switch from the first frequency channel to a second frequency channel upon detection of, for example, an interference over the first frequency channel, e.g., if an interferer signal is received with more than −63 dBm; a performance degradation over the first frequency channel, which may be measured, for example, in terms of Signal-to-Noise-Ratio (SNR) and/or in terms of Bit Error Rate (BER); and/or based on any other criterion. In some demonstrative embodiments, determining whether to switch from the first frequency channel may be performed by a source module, e.g., source module 102 (FIG. 1), for example, upon the source module detecting an interferer, or upon the source module receiving from the destination module a message indicating a detected interference.

As indicated at block 606, the method may include searching for at least one free frequency channel during a search period. As indicated at block 608, the searching may include searching for the at least one free channel during a VB period. For example, the source module, e.g., source module 102 (FIG. 1), and/or destination module, e.g., destination module 110 (FIG. 1), may search for one or more free frequency channels during a VB time period, for example, if the destination module does not perform an uplink transmission, e.g., as described above with reference to FIG. 3.

In some demonstrative embodiments, a channel availability table may be maintained at the first and/or second modules. The channel availability table may include a status, e.g., free or occupied, for one or more frequency channels, e.g., for each allowed frequency channel.

In some demonstrative embodiments, searching for the at least one free frequency channel may include switching to a frequency channel to be checked, e.g., a predefined frequency channel of a predefined set of frequency channels; performing a carrier sense operation to detect whether the frequency channel is free or occupied; updating the channel availability table according to the result of the carrier sense operation; and switching back to the first frequency channel. The destination module may indicate to the source module the status of the frequency channels, e.g., by transmitting an update message including information corresponding to the channel availability table.

As indicated at block 610, the method may include transmitting over the first frequency channel at least one wireless video frame from the first module to the second module. The video frame may include an indication of a second frequency channel to be used for communication between the first and second modules, and an indication of a time at which the first and second modules are to switch to the second transmission channel ("the switching time"). For example, a header of the video frame may include a first indication of the second frequency channel, and/or a second indication of the time at which the first and second modules are to switch to the second transmission channel. For example, source module 102 (FIG. 1) may transmit at least one video frame including the first and/or second indications to destination module 110 (FIG. 1), for example, during a downlink transmission period, e.g., as described above with reference to FIG. 3.

As indicated at block 612, in some demonstrative embodiments, transmitting the at least one video frame may include transmitting a sequence of video frames. A header of each of the sequence of frames may include the indication of the second frequency channel, and/or an indication of a remaining number of frames of said sequence to be transmitted.

As indicated at block 614, the method may include switching the first module to transmit over the second frequency channel. For example, source module 102 (FIG. 1) may switch to transmit over the second frequency channel, e.g., at the switching time.

As indicated at block 618, switching the first module to transmit over the second frequency channel may include switching the first module during a VB time period. For example, source module 102 (FIG. 1) may switch to the second frequency channel during the VB time period, e.g., as described above with reference to FIG. 3.

Figure 7:
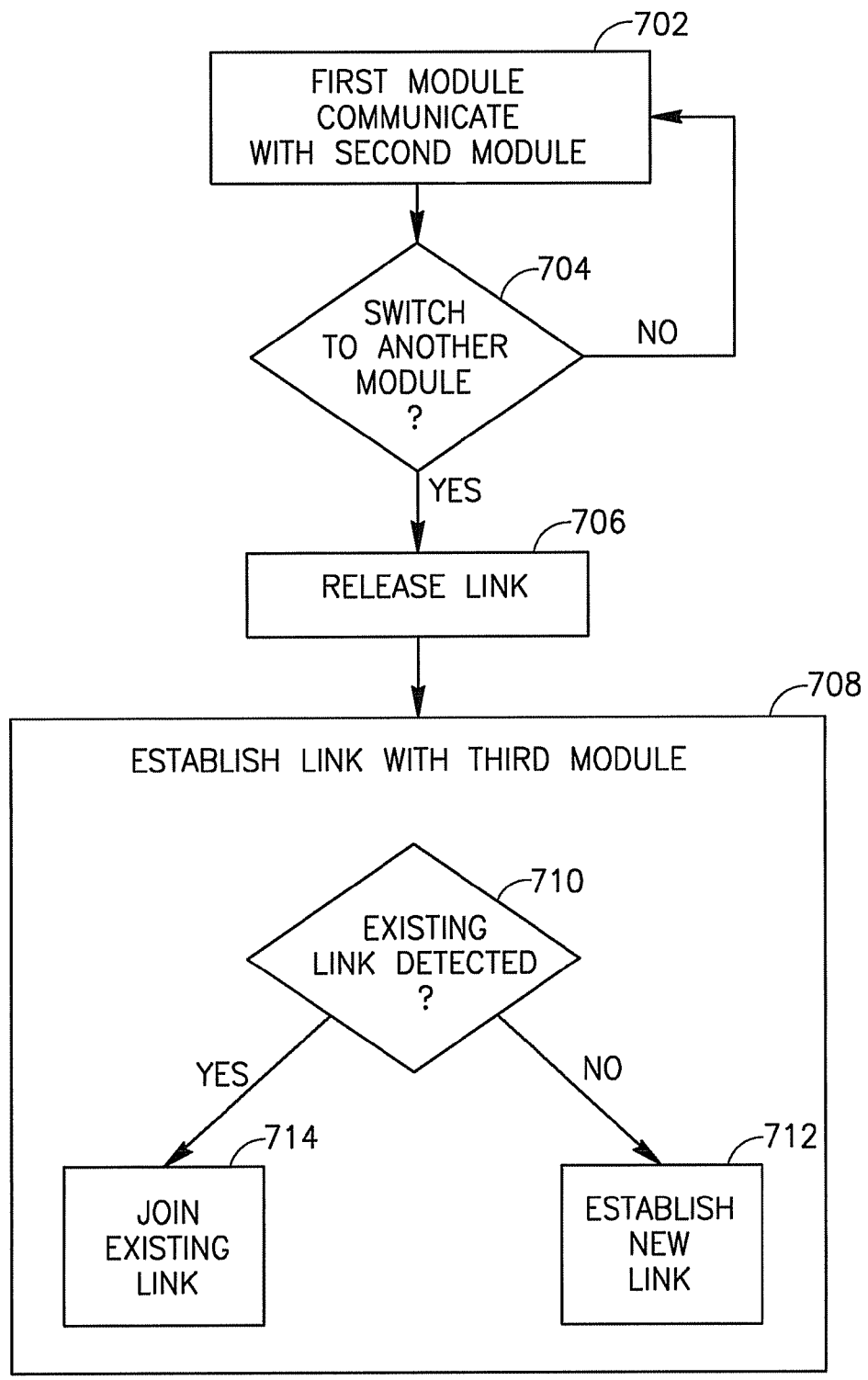
FIG. 7 is a schematic flow-chart illustration of a method of over the air switching communication between a plurality of wireless video communication modules, in accordance with some demonstrative embodiments.

Reference is now made to FIG. 7, which schematically illustrates a method of over the air switching communication of a first wireless video communication module between second and third wireless video communication modules, in accordance with some demonstrative embodiments. Although embodiments of the invention are not limited in this respect, according to some demonstrative embodiments one or more operations of the method of FIG. 7 may be performed by a module of one of groups 101 (FIG. 1) and 103 (FIG. 1) to selectively switch communication between at least first and second modules of another of groups 101 (FIG. 1) and 103 (FIG. 1).

As indicated at block 702, the method may include communicating wireless transmissions between first and second modules. For example, a module of one of groups 101 (FIG. 1) and 103 (FIG. 103) may communicate with a module of another of groups 101 (FIG. 1) and 103 (FIG. 1), e.g., as described above.

As indicated at block 704, the method may include selectively switching the first module from communicating with the second module to communicate with a third module, e.g., of the same group as the second module. For example, the first module may switch from the second module to the third module based on an instruction from the user of the first module.

As indicated at block 706, the method may include releasing a wireless communication link between the first and second modules. For example, the first module may perform a link release operation to release the link with the second module, e.g., as described above.

As indicated at block 708, the method may include establishing a wireless communication link between the first and third modules.

In some demonstrative embodiments, the first, second and third modules may include a destination module, a first source module and a second source module, respectively. According to these embodiments, establishing the wireless communication link between the first and third modules may include detecting whether the third module is in communication with one or more other modules, e.g., via an existing communication link.

As indicated at block 714, in some embodiments, the method may include joining the existing link. For example, destination module 110 (FIG. 1) may join an active network including source module 102 (FIG. 1) and one or more other source modules of group 101 (FIG. 1).

As indicated at block 712, in some embodiments, establishing the link may include establishing a new communication link with the third module. In one example, the first, second and third modules may include a destination module, a first source module and a second source module, respectively; and the destination module may establish a new communication link with the second source module. In another example, the first, second and third modules may include a source module, a first destination module and a second destination module, respectively; and the source module may establish a new communication link with the second destination module.

In some demonstrative embodiments, the switching may include communicating between the first and third modules via the same communication channel used for communicating between the first and second modules, e.g., if the communication channel used for communicating between the first and second modules is not occupied. In other embodiments, the switching may include communicating between the first and third modules via a communication channel different from the communication channel used for communicating between said first and second modules, e.g., if the communication channel used for communicating between the first and second modules is occupied.

Although embodiments of the invention are not limited in this respect, in some demonstrative embodiments one or more operations of the method of FIG. 7 may be implemented by a destination module of group 103 (FIG. 1) to switch between communicating with at least first and second source modules of group 101 (FIG. 1). For example, the destination module, e.g., module 114 (FIG. 1), may be in communication with a first source module, e.g., module 102 (FIG. 1), to receive wireless video transmissions during a first time period. The destination module may switch to communicate with a second source module, e.g., module 104 (FIG. 1), to receive wireless video transmissions during a second time period. The destination module may switch between the source modules based on any suitable criterion. In one example, the destination module may switch between the source modules based on an instruction from a user of the destination module, e.g., which may be received via interface 184 (FIG. 1). In another example, the destination module may automatically switch between the source modules based on any suitable criterion, e.g., a quality of the communication link between the destination module and the source modules.

Although embodiments of the invention are not limited in this respect, in some demonstrative embodiments one or more operations of the method of FIG. 7 may be implemented by a source module of group 101 (FIG. 1) to switch between communicating with at least first and second destination modules of group 103 (FIG. 1). For example, the source module, e.g., module 102 (FIG. 1), may be in communication with a first destination module, e.g., module 110 (FIG. 1), to transmit to the first destination module wireless video transmissions during a first time period. The source module may switch to communicate with a second destination module, e.g., module 114 (FIG. 1), to transmit to the second destination module wireless video transmissions during a second time period. The source module may switch between the destination modules based on any suitable criterion. In one example, the source module may switch between the destination modules based on an instruction from a user of the source module, e.g., which may be received via interface 181 (FIG. 1). In another example, the source module may automatically switch between the destination modules based on any suitable criterion, e.g., a quality of the communication link between the source module and the destination modules.

Some embodiments may be implemented by software, by hardware, or by any combination of software and/or hardware as may be suitable for specific applications or in accordance with specific design requirements. Some embodiments may include units and sub-units, which may be separate of each other or combined together, in whole or in part, and may be implemented using specific, multi-purpose or general processors, or devices as are known in the art. Some embodiments may include buffers, registers, storage units and/or memory units, for temporary or long-term storage of data and/or in order to facilitate the operation of a specific embodiment.

While certain features have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method of registering wireless video modules, the method comprising:

establishing an uncoordinated communication channel over a wireless communication link between a first wireless video module which includes at least one antenna and a first transceiver, and a second wireless video communication module which includes at least one antenna;

transmitting via the first transceiver a first registration message from the first wireless video communication module to the second wireless video communication module, wherein said first registration message comprises first information identifying said first module to said second wireless video communication module;

wherein transmitting said first registration message comprises transmitting said first registration message to said second module only if a registration instruction to register said first and second modules is received;

wherein transmitting said first registration message comprises transmitting said first registration message within a predefined time period after receiving the registration instruction;

comprising transmitting a second registration message from said second module to said first module only if a registration instruction to register said first and second modules is received;

receiving at said first module said second registration message from said second wireless video communication module, wherein said second registration message: (a) is generated by said second module in response to receipt of said first registration message and (b) comprises second information identifying said second module to said first wireless video communication module;

based on said first and second registration messages, registering said first video communication module at said second wireless video communication module and said second video communication module at said first wireless video communication module; and transmitting video information via the first transceiver to the second wireless communication module.

2. The method of claim 1, wherein transmitting said second registration message comprises transmitting said second registration message within a predefined time period after receiving the instruction to register said first and second modules.

3. The method of claim 1, wherein registering said first and second modules comprises: storing said first information at said second module; and storing said second information at said first module.

4. The method of claim 1, wherein said first information comprises a first media-access-control address assigned to said first module, and wherein said second information comprises a second media-access-control address assigned to said second module.

5. The method of claim 4, wherein said first and second media-access-control addresses uniquely identify said first and second modules, respectively.

6. The method of claim 1, wherein at least one of said first and second registration messages comprises a public encryption key.

7. The method of claim 1, wherein at least one of said first and second registration messages comprises an indication of a module type of at least one of said first and second modules, respectively.

8. The method of claim 1, wherein one of said first and second modules comprises a video source module, and wherein another of said first and second modules comprises a video destination module.

\* \* \* \* \*